US006738691B1

United States Patent
Colgate et al.

(10) Patent No.: US 6,738,691 B1
(45) Date of Patent: May 18, 2004

(54) CONTROL HANDLE FOR INTELLIGENT ASSIST DEVICES

(75) Inventors: J. Edward Colgate, Evanston, IL (US); Michael A. Peshkin, Evanston, IL (US); Julio Santos-Munné, Glenview, IL (US); Alex Makhlin, Skokie, IL (US); Paul F. Decker, Chicago, IL (US); Stephen H. Klostermeyer, Arlington Heights, IL (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 10/147,141

(22) Filed: May 16, 2002

Related U.S. Application Data (60) Provisional application No. 60/291,702, filed on May 17, 2001.

(51) Int. Cl.[7] ............................................. G06F 19/00
(52) U.S. Cl. ...................... 700/245; 700/249; 700/259; 700/260; 700/262; 318/568.11; 318/568.16; 318/628; 318/632; 901/3; 901/9; 901/15; 414/730
(58) Field of Search ............................... 700/245, 249, 700/259, 264, 260; 318/628, 568.11, 568.16, 632; 701/2; 414/5, 730; 244/161; 901/3, 9, 15

(56) References Cited

U.S. PATENT DOCUMENTS

| | | | | |
|---|---|---|---|---|
| 4,173,424 A | * | 11/1979 | Whitehead et al. | 414/517 |
| 4,761,954 A | * | 8/1988 | Rosman | 60/414 |
| 4,831,531 A | * | 5/1989 | Adams et al. | 701/2 |
| 4,942,529 A | * | 7/1990 | Avitan et al. | 701/50 |
| 5,130,632 A | * | 7/1992 | Ezawa et al. | 318/568.11 |
| 6,377,011 B1 | * | 4/2002 | Ben-Ur | 318/566 |
| 6,385,509 B2 | * | 5/2002 | Das et al. | 700/260 |
| 2001/0020200 A1 | * | 9/2001 | Das et al. | 700/260 |

OTHER PUBLICATIONS

Rominger et al., Extending the Reach of the Space Station, 2001, Internet, pp. 21–31.*
Hamacher et al., Asystem to measure absolute low frequency acceleration on teh international space station, 1999, Internet, pp. 1–5.*
Hamacher et al., Microgravity measurements of ASAM on spacelab MSL–1, 1998, Internet, pp. 1–9.*
Draper et al., "Next Generation Munitions Handler: Human–Machine Interface and Preliminary Performance Evaluation," Proceedings of the 8th International Topical Meeting on Robotics and Remote Systems, Pittsburgh, PA 1999, 11 pages.
Herman, D., "Robot Handler Strong–Arms Weapons," Jun. 1997, 7 pages. http://www.memagazine.org/backissue/june97/departments/news_notes/news_note.html.

* cited by examiner

Primary Examiner—William A. Cuchlinski, Jr.
Assistant Examiner—Marc McDieunel
(74) Attorney, Agent, or Firm—Pillsbury Winthrop LLP (57) ABSTRACT

A method and system for controlling an intelligent assist device, robot, or other powered system that is partially or fully directed by the intent of a human operator. The method and system includes measuring a force or motion imparted by the human operator to a control. The measurement is determined with respect to the motion of the machine at a point of the machine that allows the benefit of collocation of sensing and actuation, or of approximation of such collocation. The system includes a support attached to the machine at the beneficial point, and a plurality of sensors to measure the force, torque, or motion imparted by the human operator to the support with respect to the beneficial point. The method and system provide improved stability of control of the system, and improved responsiveness to the intent of the human operator.

40 Claims, 8 Drawing Sheets

CONTROL HANDLE FOR INTELLIGENT ASSIST DEVICES

RELATED APPLICATION

This application claims priority to U.S. Provisional Application 60/291,702, which was filed on May 17, 2001, and which is incorporated herein by reference in its entirety.

FIELD OF THE INVENTION

This present invention relates in general to the field of programmable robotic manipulators, and assist devices that can interact with human operators.

BACKGROUND OF THE INVENTION

An Intelligent Assist Device (IAD) is in a class of computer-controlled machines that interacts with a human operator to assist in moving a payload. An IAD may provide a human operator with a variety of types of assistance, including supporting payload weight, helping to overcome friction or other resistive forces, helping to guide and direct the payload motion, or moving the payload without human guidance.

Currently, a great deal of assembly and material handling work is done with the help of an x-y overhead rail system. Two exemplary types of x-y overhead rail systems include powered overhead bridge cranes for large loads usually running on I-beams, and unpowered overhead rail systems for smaller loads (e.g., up to a few hundred pounds), running on low-friction enclosed rails. Bridge cranes are typically slow and are usually controlled via pushbuttons. Enclosed rail systems are typically moved by direct application of the user's force to the payload. Enclosed rail systems are usually faster and more pleasant to use than bridge cranes, and often allow greater operator dexterity.

Getting the payload moving in an x-y overhead rail system is usually done by forward pushing, therefore using the large muscles of the lower body, which are not easily injured. However, controlling the motion of the moving payload can lead to a greater problem, as it requires pulling sideways with respect to the payload's direction of motion, generally using the smaller and more easily injured muscles of the upper body and back. Stopping the motion of the moving payload can also be problematic as it involves muscles of the upper body and back.

Furthermore, although low-friction x-y overhead designs are used, both the friction and the inertia are greater in the direction in which the payload has to carry with it the whole bridge rail than in the direction in which the payload simply moves along the bridge rail. Thus, anisotropy produces an unintuitive and undesirable response of the payload to applied user forces and often results in the user experiencing a continuous sideways "tugging" as the payload moves, in order to keep it on track. Both steering and anisotropy contribute to ergonomic strain, lower productivity, and a changeover to slow bridge cranes at an unnecessarily low payload weight threshold.

An IAD attempts to combine the powered assistance currently available with bridge cranes, and also the quick and intuitive operator interface available with unpowered rail systems. Ideally, IAD systems also improve upon the performance of unpowered rail systems and provide greater dexterity and speed than powered bridge cranes. However, although current IAD systems attempt to combine the best of overhead systems, many systems present another set of undesirable limitations.

Figure 1:
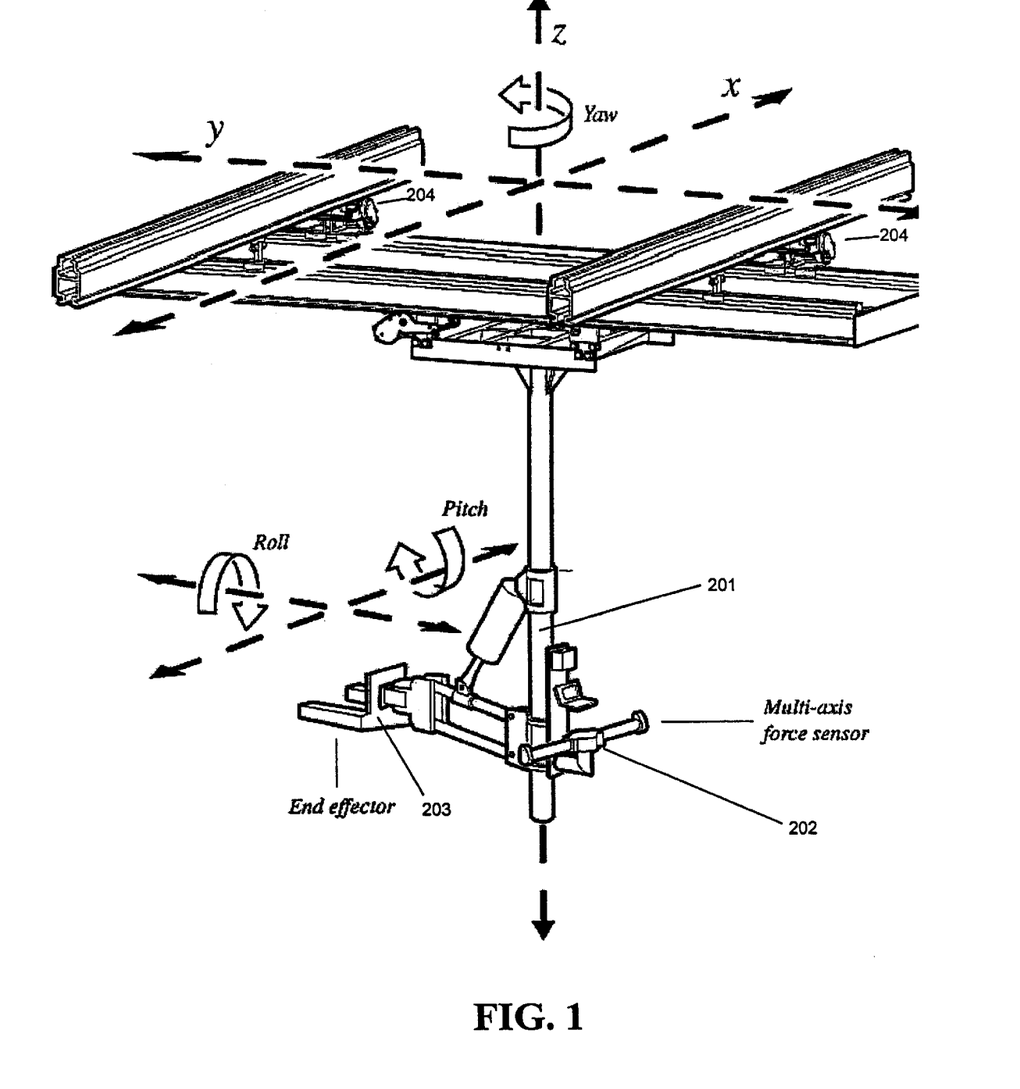
FIG. 1 is a diagram of an approach to intent sensing for an Intelligent Assist Device, in which operator-applied forces are measured by a multi-axis force sensor.

FIG. 1 illustrates an exemplary approach that has been developed for IAD systems in which the payload is hung from a "rigid descender". The rigid descender, also known as a "manipulator arm," is manufactured by a variety of companies including Creative Ergonomic Systems (Sterling Heights, Mich.), Jomat Industries (Romeo, Mich.), Protomark (Clinton Twp., Mich.), Knight Industries (Auburn Hills, Mich.), and Scaglia S.p.A. (Brembilla, Italy). They are used instead of cables to reach under an overhang (e.g., place a component inside an automobile body, where the roof of the automobile acts as an overhang), to accommodate a shifting center of gravity, or if a high level of rigidity is needed for any other reason depending on the particular application.

Figure 2:
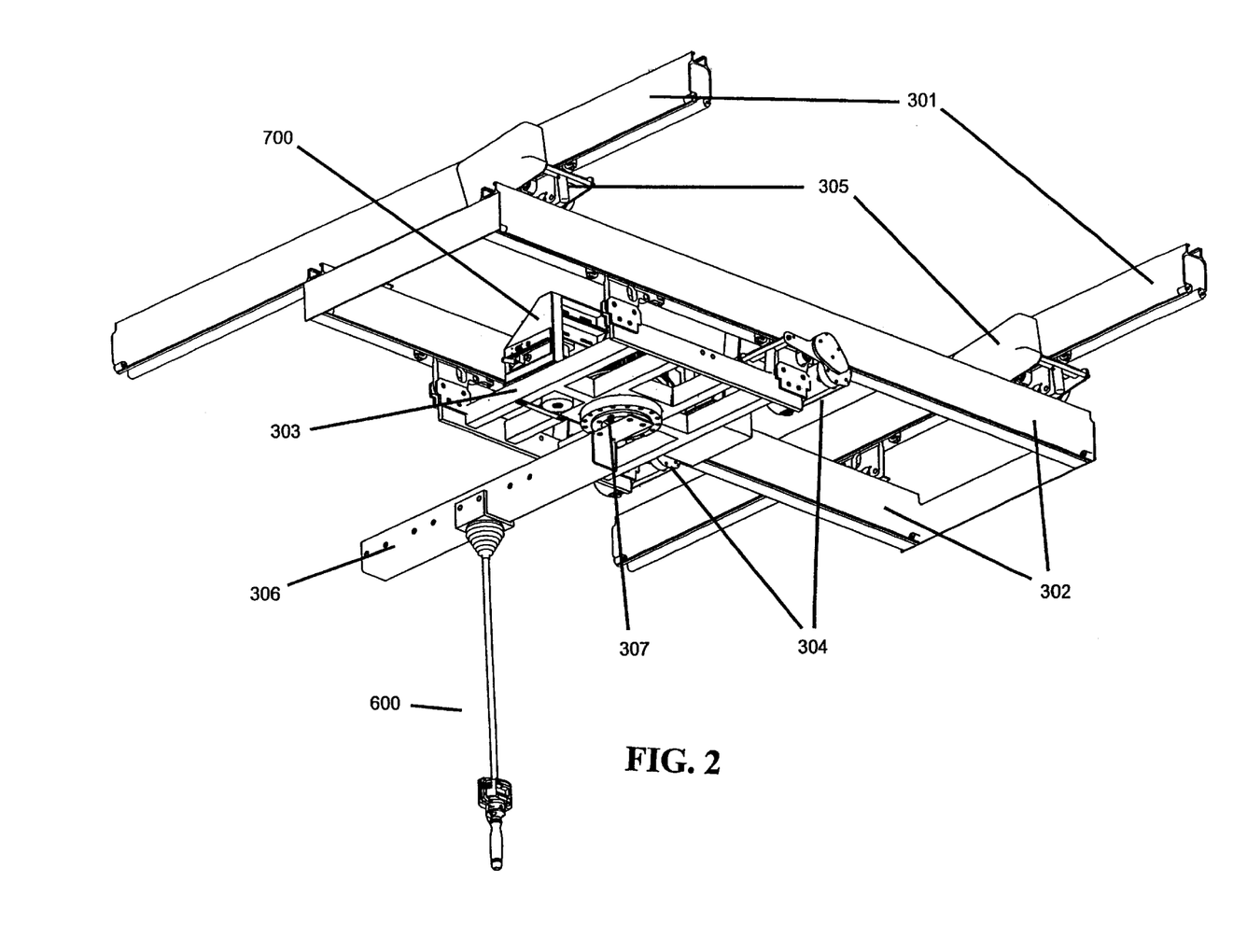
FIG. 2 is a diagram of an exemplary four-axis guide stick suspended from a bridge crane with three powered axes.

In this type of system, a multi-axis force sensor 202 is used to measure operator-applied forces and torques. These measurements are used as an indicator of intent. Sensor 202 may be mounted directly to rigid descender 201 as shown, or to end-effector 203, or to some other location convenient for the operator. Not only can horizontal motion intent be measured in this way, but with a sensor such as the ATI F/T sensor system manufactured by ATI Industrial Automation (Apex, N.C.) or the Cobotics, Inc. multi-axis intent sensor, vertical motion intent as well as intent in the roll, pitch and yaw axes, can be measured. These measurements may, in principle, be used to drive corresponding powered axes. There must, of course, be drive systems associated with those axes (the only drive units shown in FIG. 2 are motorized drive units 204 for horizontal motion).

The operator must grasp an intent sensor 202 rather than either the part itself (not pictured) or the end-effector 203, but there is typically a high degree of correspondence between the motion of the intent sensor and the motion of the part. The operator simply pushes and the part follows. There is also an ergonomic benefit to this approach, in that the forces required are typically much lower than those required in an unpowered system.

However, there are undesirable limitations such as the absence of motorized drive units for axes of motion other than horizontal. For example, rotation about the vertical (yaw) is almost always a requirement when rigid descenders are used, but currently there is not a commercially available drive unit for this particular rotation. Another undesirable limitation is that many commercially available rigid arms incorporate pivoted joints that permit yaw motion and are neither powered nor outfitted with angle sensors. As a consequence, it is not possible to establish the orientation of the intent sensor with respect to the overhead bridge rail without retrofitting those arms with joint angle sensors. This retrofit process is expensive and unique to each particular arm design.

Yet another limitation is that this approach involves "non-collocated" control. Non-collocation refers to the presence of significant structural flexibility between the point of sensing (e.g., at the intent sensor) and the point of actuation (e.g., at the bridge and runway rails). It is well-known that non-collocated systems are difficult to control and prone to instability. Generally speaking, the control system bandwidth or system response is limited by the lowest-frequency structural mode, which is typically in the 1 Hz range. As a consequence, the responsiveness of the control system may not be dramatically better than that of the unassisted rigid arm. Accordingly, the ergonomic benefits may be limited.

A serial manipulator may be described as a kinematic chain, extending from a ground reference frame, through various links, supports, and through powered or unpowered joints, finally to a payload at the end of the chain. A mounting location of an intent sensor may be referred to as more proximal as it is closer to the ground of the kinematic chain, and more distal as it is closer to the payload of the kinematic chain. Similar terminology may be used for a parallel kinematic mechanism, and for hybrid serial/parallel mechanisms.

The prior art shows a number of undesirable limitations including limited ergonomic benefit, especially for larger payloads. Some systems exhibit potentially unstable behavior, and the inability to adapt easily to the many styles of commercially-available descenders, including cable, chain, and various rigid arm designs. Moreover, many systems lack a standard motorized drive unit for yaw rotation in rigid descenders.

SUMMARY OF THE INVENTION

A method and system is provided to measure the motion intent of a human operator in one or more axes. According to the exemplary embodiments, the method and system are implemented on an Intelligent Assist Device (IAD).

According to an aspect of the present embodiment, a system provides intuitive control, preferably such that the human operator has direct and intuitive control over motion speed and direction of a payload. In the exemplary embodiment, the operator can push or twist the a sensor in a particular direction and the IAD would move in that direction. Preferably, the harder the operator pushes, the faster the IAD should move. The sensor is preferably located "upstream" on the system to prevent low frequency vibrational modes from interfering with the sensor signals.

According to another aspect of the present embodiment, a system facilitates ergonomic benefit, even for large loads (e.g., ¼ ton or larger). In the exemplary embodiment, the human operator can provide modest forces and torques to operate the IAD, and these forces and torques preferably do not scale significantly with payload inertia.

Another aspect of the present embodiment, a system makes possible collocation of intent sensing and actuation for horizontal motions as well as yaw rotation. In the exemplary embodiment, a minimal structural compliance exists between the point of intent sensing and the point at which the motorized drive units act.

Yet another aspect of the present embodiment, the system facilitates compatibility with a wide range of commercially-available descenders. In the exemplary embodiment, existing intent sensors are improved by being compatible with both cable/chain based and rigid descender based systems. Preferably, various types of rigid descenders (e.g., manipulator arms) can be accommodated.

According to an aspect of the present embodiment, a standard motorized drive unit is provided for yaw rotation that may be used with a wide range of commercially-available descenders.

The exemplary embodiments provide flexible ergonomic benefit, because the system preferably involves collocated control, which can make the system easier to control. Moreover, the exemplary embodiments promote stable behavior, including the ability to adapt easily to the many styles of commercially-available descenders, including cable, chain, and various rigid arm designs. Also, the exemplary embodiments can include a standard motorized drive unit for yaw rotation. According to the teachings described herein, the method and apparatus can be utilized by other devices that can use the measured motion intent, if so desired.

The foregoing and other objects, features and advantages of the automated execution system having firm participation will be apparent from the following more particular description of preferred embodiments as illustrated in the accompanying drawings.

DETAILED DESCRIPTION OF PREFERRED EMBODIMENTS

The exemplary embodiments disclose a system and method for controlling an assist device or robotic manipulator that can interact with a human operator. The exemplary embodiments have been implemented in an Intelligent Assist Device (IAD) system that includes a support for controlling the movement of a payload. More specifically, the exemplary embodiments have been implemented using a rigid physical support or "guide-stick" for controlling the movement of the payload. Exemplary assist devices or IADs are illustrated and described in commonly owned U.S. patent application Ser. No. 09/781,683, the contents of which are incorporated by reference herein; in commonly owned U.S. Provisional Patent Application Serial No. 60/267,790, the contents of which are incorporated by reference herein; and in commonly owned U.S. patent application Ser. No. 09/246,826.

It should be understood, however, that the present embodiments may utilize other types of support structures such as supports that are rigid, semi-rigid, or devices that do not use a physical support, described more below, for controlling the movement of the IAD and the payload carried by the IAD. Therefore, details regarding the IAD, the payload carried by the IAD, and the types of supports for controlling the payload are provided as an example, and are not necessary to the invention unless otherwise specified.

FIG. 2 is an illustration of an exemplary guide-stick intent sensor and powered bridge crane. The viewpoint in this illustration is that of an observer standing underneath the bridge crane and looking upward. This exemplary embodiment of the guide stick contains sensors sufficient to control up to four degrees of freedom of the IAD including motion along two horizontal axes (one axis is aligned with runway rails 301 and the other with the bridge rails 302), rotation about the vertical axis, and vertical motion. The bridge crane provides drive units for motion along the bridge rail, motion along the runway rails, and rotation about the vertical (yaw rotation). The drive unit for yaw rotation is further described in FIGS. 6–8. A drive unit for vertical motion would normally be part of the descender, which is not shown in FIG. 3 for clarity. It should be emphasized that, while the preferred embodiment contains sensing for four degrees of freedom, implementations having either more or fewer degrees of freedom are possible.

The runway rail 301 and bridge rails 302 are structural components that may take a number of different forms, including I-beam and enclosed track profiles of known type. In a preferred embodiment, RAD4800A enclosed track aluminum rail from Knight Industries (Auburn Hills, Mich.) is used. Runway rails 301 are fixed rigidly to ground, typically via steel supports or overhead steel beams, not shown. Carriage frame 303 rolls along bridge rails 302, and both bridge rails 302 rolls along runway rails 301.

In a preferred embodiment, two motorized drive units 304 drive carriage frame 303 along bridge rail 302, and motorized drive units 305 at either end of bridge rail 302 drive the bridge rail along runway rails 301. Of course, it is not necessary to use two motorized drive units per axis. For many applications, a single unit per axis will suffice, and for other applications with very large loads, more than two units per axis may be needed. Nor is it necessary to use the same number of drive units on the bridge rails as on the runways. In a preferred embodiment, motorized drive units 304 and 305 are iTrolleys available from Cobotics Inc. (Evanston, Ill.), which includes onboard computer and interface electronics for control purposes.

It should be noted that, while the preferred embodiment of the invention is based upon a bridge crane architecture, other well-known crane architectures may be used. Specifically, it is possible to use a monorail, jib crane, articulated jib crane, or gantry crane without altering the intent of the invention.

Also in a preferred embodiment, powered rotate assembly 700 is rigidly mounted to carriage frame 303. Mounting flange 307 is connected rotatably to carriage frame 303. The rotation axis of mounting flange 307 is vertical (perpendicular to the plane in which runways rails 301 lie). As described further below, powered rotate assembly 700 is used to drive rotations of mounting flange 307. A standard manipulator arm or other descender may be secured to mounting flange 307.

The bridge rail system described thus far is capable of powered motion in three axes: translation along runways 301, translation along bridge rails 302, and rotation of mounting flange 307. This bridge rail system can be expected to exhibit high structural stiffness as compared to a typical descender, be it a cable, chain, or rigid manipulator arm. Thus, in order to achieve "collocation", as discussed above, it is desirable to minimize the structural flexibility that separates the output of these powered axes (namely mounting flange 307) from the location of operator intent sensing. This is achieved with strut 306 and support or "guide stick" assembly 600. Strut 306 is a stiff beam that is mounted directly to mounting flange 307. Guide stick assembly 600 is mounted to strut 306 and is, as a result, effectively collocated with the drive units 304, 305 and 700.

Strut 306 provides a plurality of mounting holes where guide stick assembly 600 may be attached. Four different mounting locations are illustrated, but of course, the number may be larger or smaller. The mounting location of guide stick assembly 600 may also be made continuously adjustable by a number of well-known techniques.

In another exemplary embodiment, it is possible to mount guide stick assembly 600 directly to carriage frame 303. In this case, the guide stick assembly remains effectively collocated with drive units 304 and 305, but becomes decoupled from drive unit 700. Similarly the guide stick assembly 600 may be mounted to the bridge rails 302 so that it remains collocated with drive units 304, but becomes decoupled from drive units 305 and 700. It may even be mounted to runway rails 301 or elsewhere to an unmoving frame so that it is decoupled from all drive units. In this case, the operator is able to remain standing in one location while commanding the motion of the various drive units.

Figure 3:
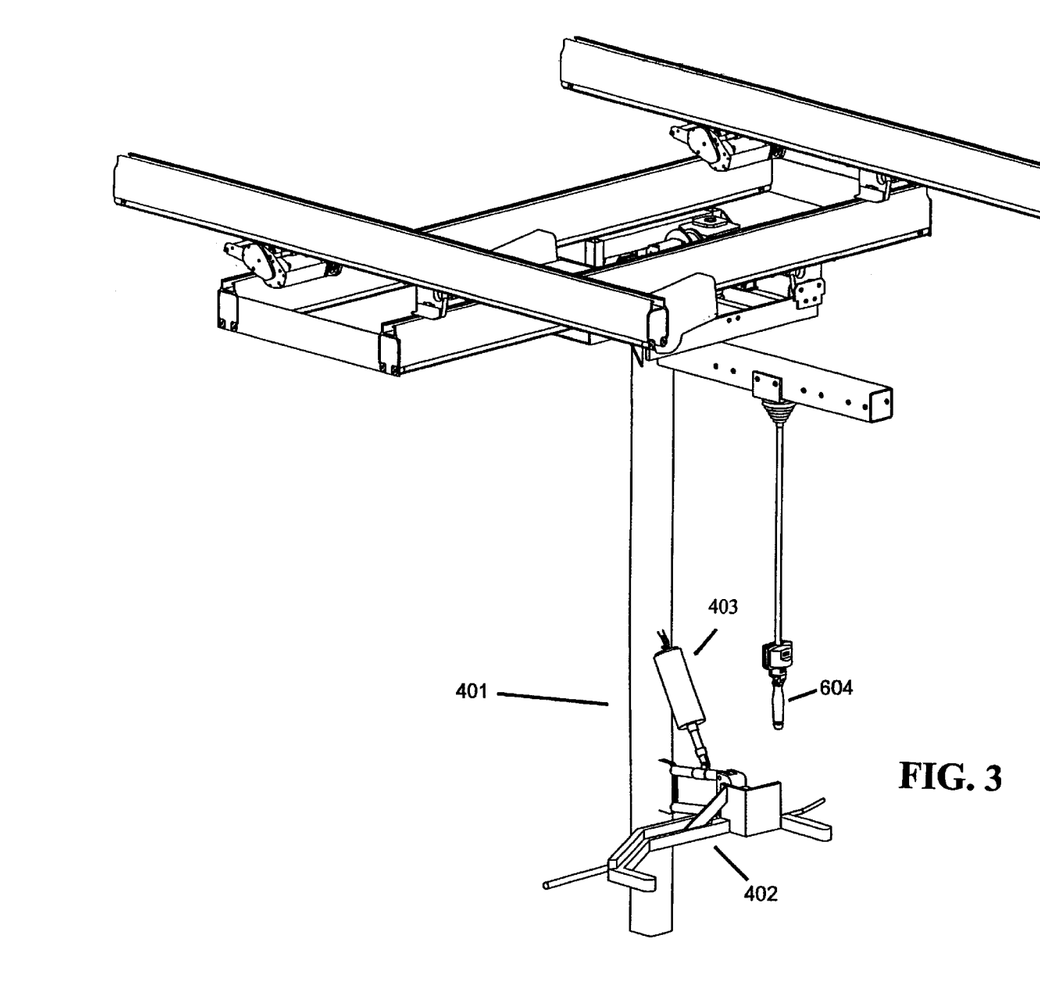
FIG. 3 is an diagram that further illustrates the system of FIG. 2, but includes a rigid descender.

FIG. 3 illustrates the manner in which a rigid manipulator arm 401 may be attached to the powered bridge rail system of FIG. 2. Although obscured in the figure for clarity, manipulator arm 401 is rigidly connected to mounting flange 307. The orientation of strut 306 and the mounting location of guide stick assembly 600 along strut 306 may be adjusted in order to present handle 604 in a location that is convenient for the operator. Handle 604 is located close to end effector 402. It is important to note that the manipulator arm 401 may be replaced by a variety of commercially available manipulator arms, as well as other rigid descenders, without altering the functionality of the present embodiment.

Figure 4:
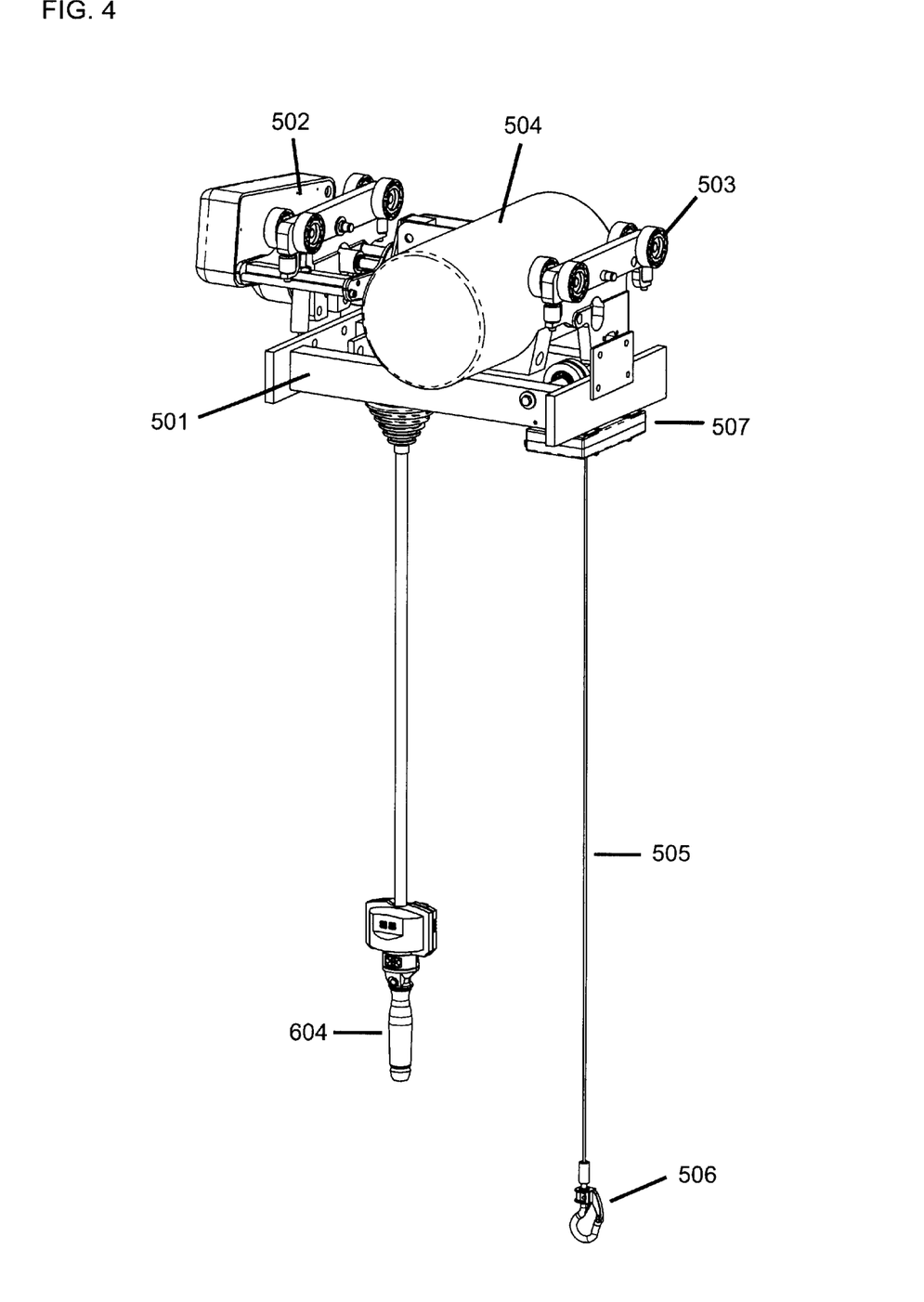
FIG. 4 is yet another diagram that illustrates the system of FIG. 2, but includes a cable-based descender.

FIG. 4 illustrates another exemplary embodiment, in which a cable or chain-based system may be attached to the powered bridge rail system. In this case, there is no need for powered rotation, because the rotational drive cannot be transmitted via a cable or chain. Therefore, powered rotate assembly 700 has been removed and replaced with a passive carriage assembly 501. Mounted to carriage assembly 501 are drive unit 502 (in a preferred embodiment, the iTrolley manufactured by Cobotics, Inc.) and passive trolley 503, which permit rolling along a pair of bridge rails (not shown).

An exemplary pneumatic balancer 504 is shown mounted on carriage assembly 501, although many other lifting devices might be used as well. Pneumatic balancer 504 employs air pressure to reel cable 505 either in or out. An end-effector or payload is normally suspended from hook 506. It is also possible to eliminate one bridge rail and mount pneumatic balancer 504 or other lifting device immediately beneath the one remaining bridge rail.

Guide stick assembly 600 is preferably mounted directly to carriage assembly 501. This configuration effectively collocates guide stick assembly 600 with drive unit 502 and the drive units for bridge rail motion (equivalent to drive units 305). The mounting location of guide stick assembly 600 may be adjusted in order to present handle 604 in a location that is convenient for the operator.

Also illustrated in FIG. 4 is an exemplary cable angle sensor 507 that detects the magnitude and orientation of any departure of the cable angle from the vertical. The cable angle sensor can be, for example, a non-contact cable angle sensor manufactured by Cobotics Inc. (Evanston, Ill.) although many other sensors could be used as well. The sensor may optionally be used in conjunction with guide stick assembly 600. In a preferred embodiment, commands for drive units (e.g., 502, 303 and 304) are based on a weighted sum of signals from both guide stick assembly 600 and cable angle sensor 507, although many other combinations of signals are possible. The use of cable angle sensor 507 in conjunction with guide stick assembly 600 allows an operator to control movement of the IAD by either pushing on the guide stick or by pushing on the payload directly. In addition, the use of cable angle sensor 507 may reduce payload oscillations that might otherwise occur. In another embodiment, the readings from cable angle sensor 507 can be used for diagnostic or other purposes instead of for contributing to the motion commands issued to the drive units.

Figure 5:
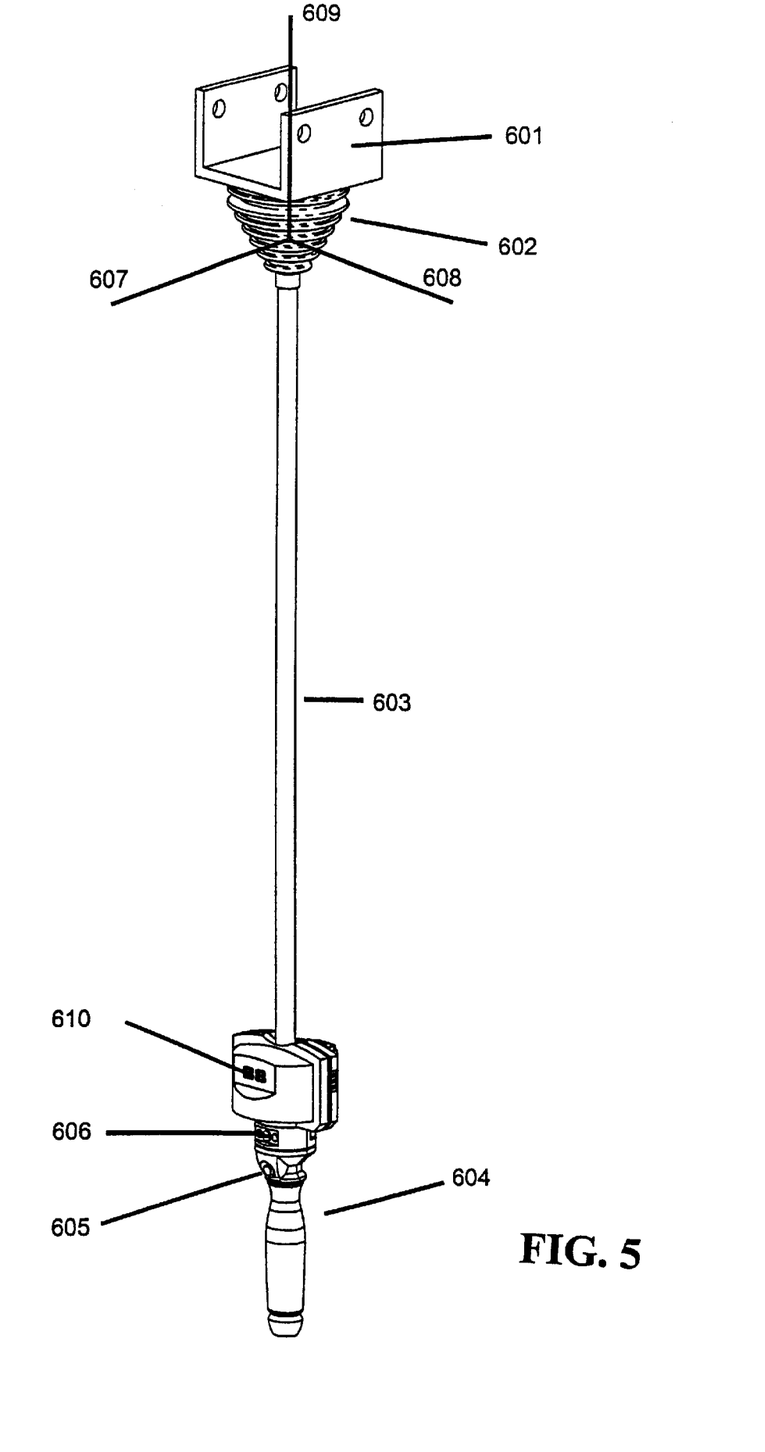
FIG. 5 is a diagram further illustrating the four-axis guide stick.

FIG. 5 illustrates the preferred embodiment of the guide stick assembly. In this embodiment, bracket 601 provides attachment to strut 306 or strut 503. Three axis industrial joystick 602 is rigidly mounted to the bottom of bracket 601. In a preferred embodiment, joystick 602 is model J50 manufactured by ETI-Systems (Carlsbad, Calif.), having rotational axes 607, 608 and 609. The J50 joystick employs conductive plastic potentiometers to measure rotation about each of these axes, but of course many other types of sensor might be used as well. In a preferred embodiment, the J50 joystick is outfitted with spring-return detents in each axis so that, when no operator force is applied to the joystick, it will return to a repeatable home position in each axis.

While joystick 602 has been presented here as an exemplary angle sensing device, many other techniques may also be used to measure guidestick 603 angle. For example, the noncontact cable angle sensor manufactured by Cobotics Inc. (Evanston, Ill.) may be used to measure rotations about axes 607 and 608. This solution would alone suffice if there is no need to measure operator intent in rotation about the vertical axis 609 (e.g., if the payload is suspended from a cable or chain as illustrated in FIG. 4). This solution could be combined with a simple rotary joint and angle sensor if operator intent is needed for rotation about the vertical.

Another alternative to joystick 602 is a sensing device that detects torques rather than angles. For instance, the Forcestick Controller P/N 55965-2 manufactured by Orbit International Corporation (Hauppauge, N.Y.) may be used to measure torques applied to axes 607 and 608 without allowing significant angular deflection about these axes.

Rigid connecting rod 603 is preferably used to connect handle 604 to joystick 602. In a preferred embodiment, handle 604 is the in-line slide handle manufactured by Cobotics Inc. (Evanston, Ill.). The operator may grasp this handle and indicate motion intent by creating twists about axes 607, 608 and 609. In addition, because the Cobotics Inc. in-line slide handle can detect forces applied in a vertical direction (i.e., along axis 609) this configuration may be used to measure operator motion intent in the vertical direction. This information would normally be relayed to the device responsible for vertical motion. Wires for this purpose are not shown in FIG. 5. The vertical motion device may be any lifting device capable of receiving an electronic signal, including electric hoists, pneumatic balancers, pneumatic cylinders such as cylinder 403 in FIG. 3, and a variety of other devices.

In a preferred embodiment, momentary switch 605 may be configured as an "operator present" switch. As such, an operator must continually depress this switch in order to enable drive unit movement. This technique ensures that the IAD will not respond to accidental displacement of the guide stick 603. Of course, there are many other ways to detect operator presence, including pressure sensors, capacitive sensors, and optical sensors.

In a preferred embodiment, switch 606 may be used to stop and restart the IAD. Preferably, the alphanumeric display 610 indicates IAD status.

Many modifications can be made to the preferred embodiment of the support or guide stick without altering its basic function. For instance, rigid rod 603 may be replaced with a rod that is slightly flexible, or even with one that is very flexible (e.g., a cable or chain). Handle 604 may be replaced with other handle configurations, or it may even be eliminated. Additional switches, controls and displays may be added to the handle assembly, or may be mounted at any point on rod 603. For instance, it may be desirable in some applications to include controls for opening and closing a gripper. As another example, it may be desirable to include controls for other axes of motion, such as roll and pitch.

Moreover, the support may not be physical, but could be replaced by a sensor such as an optical sensor (not shown). In this embodiment, the optical sensor would preferably be placed on strut (306 in FIG. 2). Then, the optical sensor could detect movement with of the operator or device held by the operator. For example, forward movement of the operator would initiate movement of the payload in the forward direction. Such operator movement would be referenced via the optical sensor.

In any event, according to the exemplary embodiment, drive unit speeds are related to guide stick measurements via the following algorithm. For the purposes of this algorithm, it is assumed that guide stick axis 607 is aligned with strut 306 as illustrated in FIG. 3. It is also assumed that θ is the angle of strut 306 with respect to bridge rails 302: θ is zero when strut 306 and bridge rails 302 align. Finally, it is assumed that L is the horizontal distance from the axis 609 to the center of mounting flange 307. $v_B$, $v_R$, and $\omega$ are the velocity commands for drive units 304, 305 and 700, respectively. $\alpha_{607}$, $\alpha_{608}$, $\alpha_{609}$ are the angle measurements obtained from axes 607, 608 and 609 of the guide stick, respectively. The algorithm is:

$$\begin{bmatrix} v_B \\ v_R \\ \omega \end{bmatrix} = \begin{bmatrix} \cos\theta & -\sin\theta & 0 \\ \sin\theta & \cos\theta & 0 \\ 0 & L & 1 \end{bmatrix} \begin{bmatrix} G_1 \alpha_{607} \\ G_1 \alpha_{608} \\ G_2 \alpha_{609} \end{bmatrix}$$

where $G_1$ and $G_2$ are parameters that may be adjusted for sensitivity of response. Many modifications to this algorithm are possible. For instance, the parameter L may be adjusted or even set to zero. The guide stick angle measurements may first be passed through a deadband function so that small angles are ignored, and these measurements may also be filtered to remove measurement noise. The velocity commands may also be made to depend on the time derivatives and time integrals of the angle measurements, resulting in a form of PID control.

Figure 6:
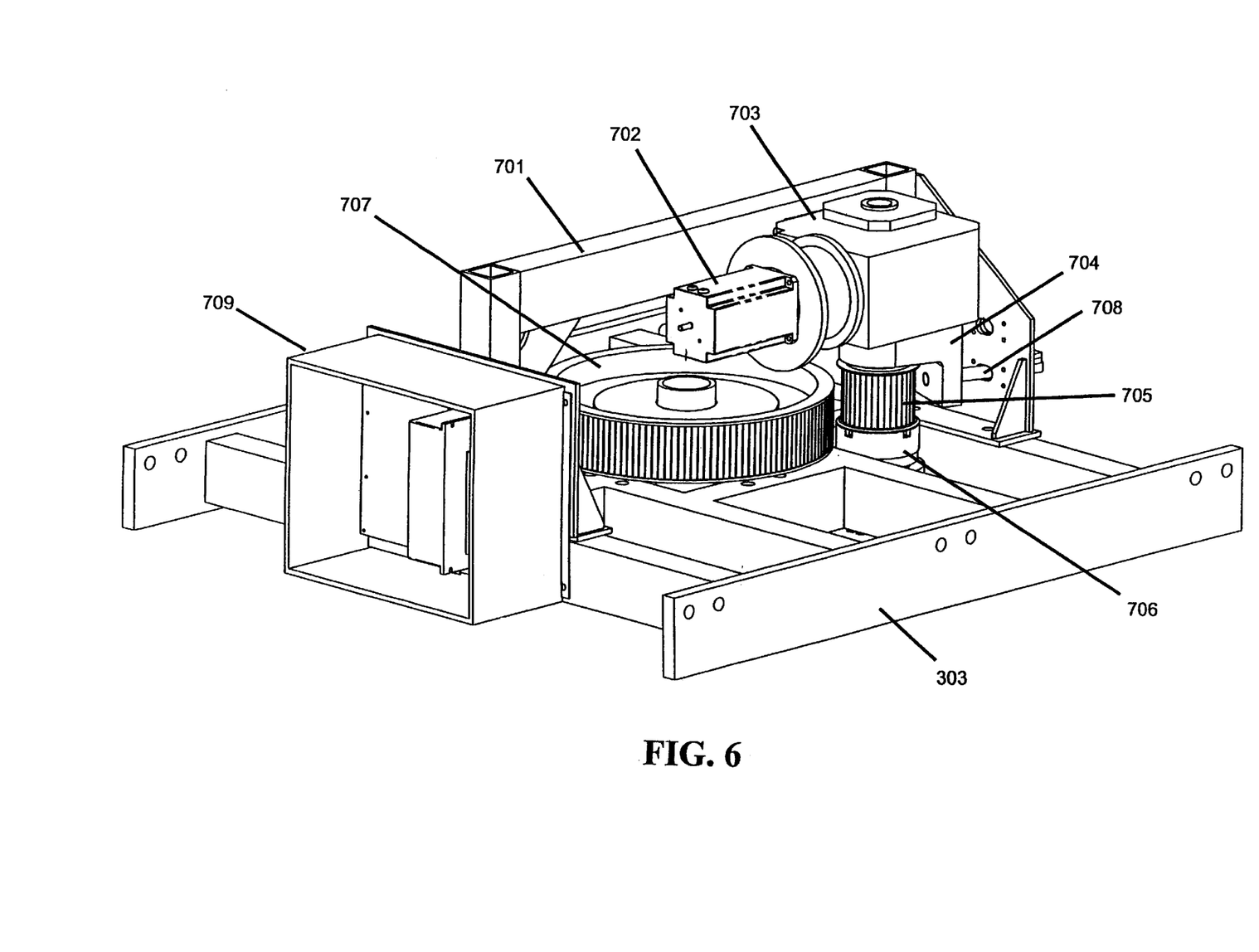
FIG. 6 is a diagram illustrating an exemplary powered rotate drive unit that provides yaw rotation.
Figure 7:
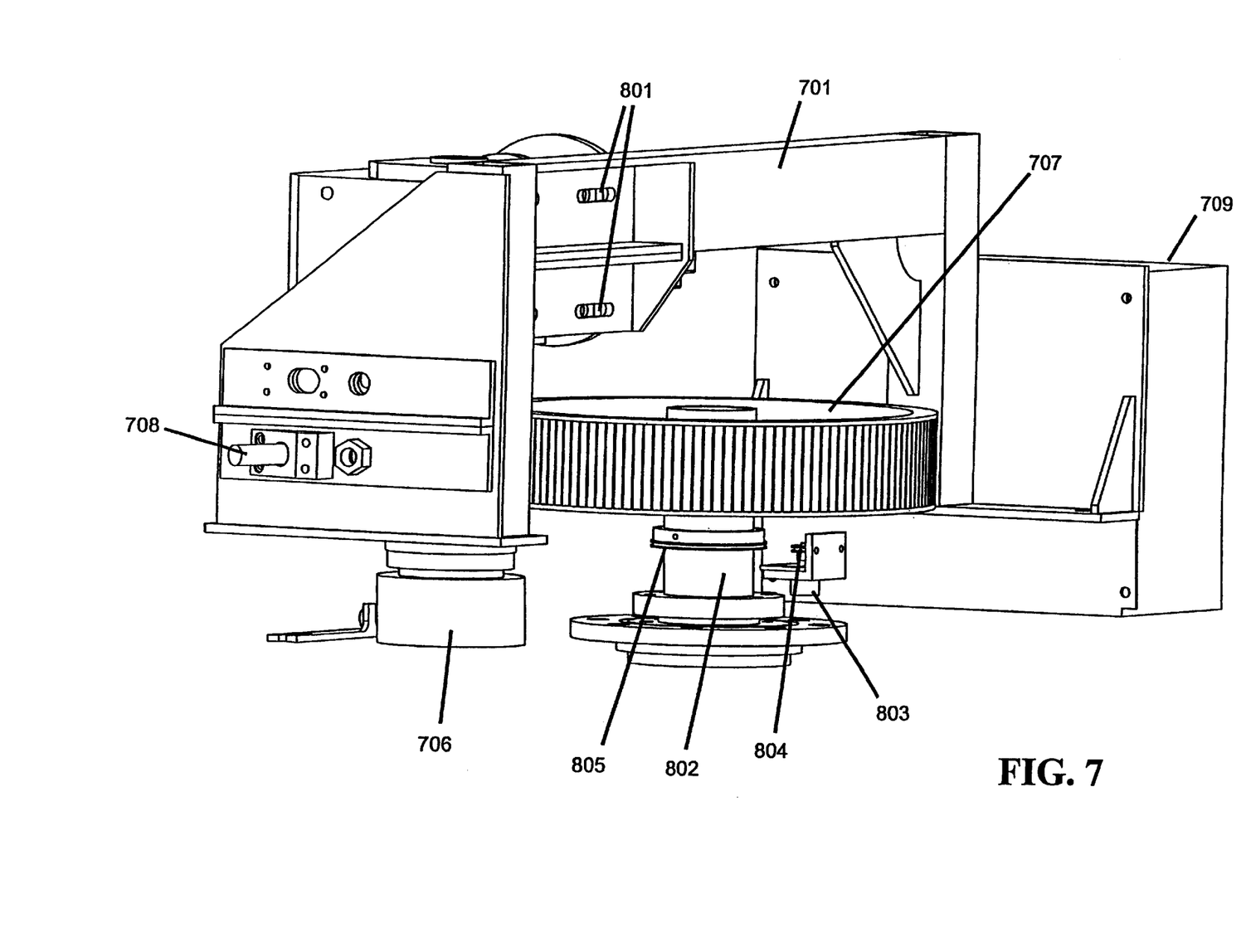
FIG. 7 is a view from the opposite side of the powered rotate drive unit of FIG. 6 with some components removed for clarity.
Figure 8:
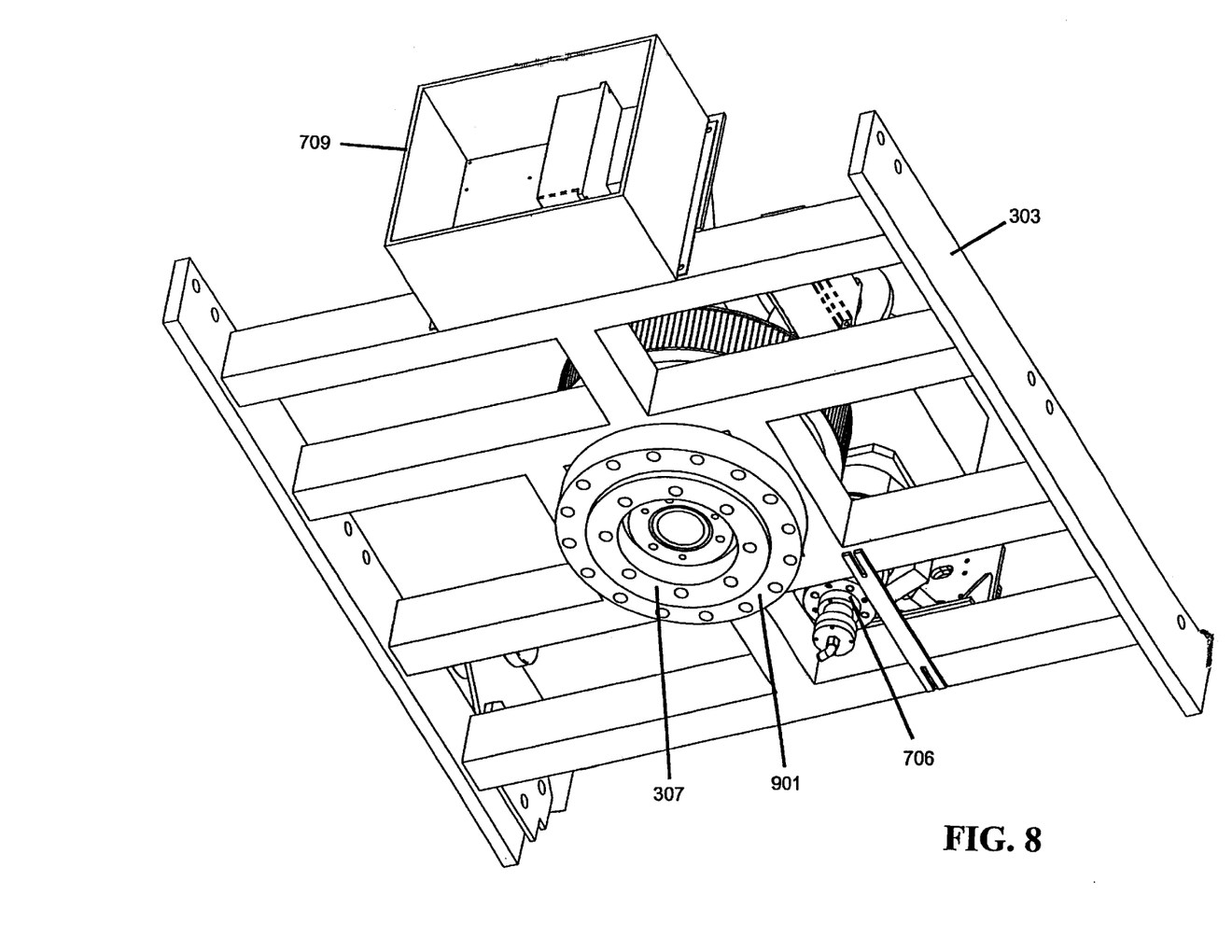
FIG. 8 is a view of the powered rotate drive unit of FIG. 6 from underneath.

FIG. 6 illustrates the exemplary drive unit 700. The FIG. 6 is from the viewpoint of an observer above and to the side of the assembly. FIG. 7 is a view from the opposite side of drive unit 700 with carriage frame 303 removed for clarity. FIG. 8 is a view of drive unit 700 from underneath.

Drive unit 700 comprises a number of components mounted to carriage frame 303. Bracket 701 is mounted rigidly to carriage frame 303. A subassembly comprising motor 702, right angle gearbox 703, tensioning bracket 704, pulley 705 and clutch 706 is mounted slidably on bracket 701. The output shaft of motor 702 causes the input shaft of gearbox 703 to rotate which causes the output shaft of gearbox 703 to rotate. The output shaft of gearbox 703 causes clutch 706 to rotate. When engaged, clutch 706 causes pulley 705 to rotate.

In a preferred embodiment, motor 702 is a model IB346-T manufactured by MCG, Inc. (Eden Prairie, Minn.), gearbox 703 is a model K202AB-0560-MQ10 manufactured by Stober Drives, Inc. (Maysville, Ky.) and having a gear ratio of 56:1, clutch 706 is a model 5AH30P manufactured by Matrix International, Ltd. (Elk Grove Village, Ill.), and pulley 705 is a model 8MX-36S-62-PB manufactured by Gates Rubber (Denver, Colo.) having 36 teeth and modified to mount on clutch 706. Of course, a variety of other industrial components may be used instead. In particular the pneumatic clutch may be replaced with an electrically actuated clutch, a pin clutch, or a number of other possible designs.

Pulley 705 engages pulley 707 via a toothed belt (not shown). In a preferred embodiment, pulley 707 is a model 8MX-140S-62 having 140 teeth and the toothed belt is a model 8MGT-1280, both manufactured by Gates Rubber (Denver, Colo.). The toothed belt is tensioned by turning threaded rod 708 which engages tensioning bracket 704. This action draws the entire subassembly comprising elements 702–706 away from pulley 707. Said subassembly is mounted to bracket 701, but allowed to slide in slots 801.

Pulley 707 is connected rigidly to mounting flange 307 by drive shaft 802. Mounting flange 307 is connected rotatably to flange 901 which is rigidly mounted to carriage frame 303. This arrangement allows motor 702 to drive rotation of mounting flange 303 when clutch 706 is engaged, and for mounting flange 307 to rotate freely when clutch 706 is disengaged.

The rotational angle of mounting flange 307 (which is used in the algorithm discussed above) is measured by potentiometer 803. Sprocket 804 mounted on the shaft of potentiometer 803 is connected to sprocket 805 mounted on drive shaft 802 by means of a no-slip belt (not shown). In a preferred embodiment, potentiometer 803 is a model MW22-10 turn manufactured by ETI Systems (Carlsbad, Calif.), and sprockets 804 and 805 are models FC5-24 and FC5-112 respectively, manufactured by Pic Design (Middlebury, Conn.). The non-slip belt is a model FA-144 also manufactured by Pic Design. Of course, a variety of other techniques known in the art may also be used to measure angle.

Electronics enclosure 709 contains electronics including a power supply (TPS80-45 manufactured by Total Power International, Lowell, Mass.), computer model Jumptec MOPS/586 manufactured by Jumptec (Deggendorf, Germany) and motor amplifier model B25A20AC-01 manufactured by Advanced Motion Controls (Camarillo, Calif.) necessary for the control of drive unit 700.

The exemplary embodiments provide flexible ergonomic benefit, because the system preferably involves collocated control, which can make the system easier to control. Moreover, the exemplary embodiments promote stable behavior, including the ability to adapt easily to the many styles of commercially-available descenders, including cable, chain, and various rigid arm designs. Also, the exemplary embodiments can include a standard motorized drive unit for yaw rotation. Moreover, the control system bandwidth or system response is increased because the lowest-frequency structural mode where the sensor is attached is in a higher frequency range. As a consequence, the responsiveness of the control system, which is proportional to the frequency, may be significantly improved compared to that of prior art systems.

According to the teachings described herein, the method and apparatus can be utilized by other devices that can use the measured motion intent, if so desired.

It should be understood that the programs, processes, methods and systems described herein are not related or limited to any particular type of support device, assist device or machine, unless indicated otherwise. Various types of general purpose or specialized assist or robotic systems may be used in accordance with the teachings described herein.

In view of the wide variety of embodiments to which the principles of the present embodiments can be applied, it should be understood that the illustrated embodiments are exemplary only, and should not be taken as limiting the scope of the present invention. For example, more or fewer elements may be used in the diagrams.

We claim:

1. A system for controlling the movement of a payload, the system comprising:

a powered manipulator having at least one axis of motion;

a support member extending downward from the powered manipulator to the payload along a substantially vertical axis; and a control handle mounted to the powered manipulator, wherein the control handle has at least one axis of sensing.

2. The system of claim 1, wherein the support member is a cable or a chain.

3. The system of claim 1, wherein the support member is a rigid descender.

4. The system of claim 3, wherein the powered manipulator can rotate the support member about the vertical axis.

5. The system of claim 3, wherein the control handle is mounted proximal to a joint, and wherein the joint allows rotation of the support member about the vertical axis.

6. The system of claim 3, wherein the control handle is mounted distal to a joint, and wherein the joint allows rotation of the support member about the vertical axis.

7. The system of claim 3, wherein the control handle is mounted proximal to a first joint, wherein the first joint allows translation of the support member along a first axis, wherein the control handle is mounted distal to a second joint, and wherein the second joint allows translation of the support member along a second axis.

8. The system of claim 3, wherein the control handle is mounted distal to a first joint, wherein the first joint allows translation of the support member along a first axis, wherein the control handle is mounted distal to a second joint, and wherein the second joint allows translation of the support member along a second axis.

9. The system of claim 1, wherein the powered manipulator is a powered bridge crane.

10. The system of claim 9, wherein the control handle is mounted to a carriage of the powered bridge crane.

11. The system of claim 1, wherein the powered manipulator is a robot.

12. The system of claim 1, wherein the powered manipulator is a monorail, a jib crane, an articulated jib crane or a gantry crane.

13. The system of claim 1, wherein the control handle uses a cable angle sensor to detect intent along the at least one axis of sensing.

14. The system of claim 1, wherein the control handle detects intent along the at least one axis of sensing using a force sensor or a force/torque sensor.

15. The system of claim 1, wherein the control handle uses a joystick to detect intent along the at least one axis of sensing.

16. The system of claim 1, wherein the control handle uses an operator present switch to enable, the powered manipulator.

17. The system of claim 1, further comprising a sensor mounted to the powered manipulator, wherein the sensor detects a motion of the payload relative to the powered manipulator in at least one axis of motion.

18. The system of claim 1, wherein the control handles comprises:

a shaft operably connected to the powered manipulator;

a grip, wherein the grip connects to the shaft; and a sensor, wherein the sensor detects intent along the at least one axis of sensing.

19. The system of claim 18, wherein the shaft is rigid.

20. The system of claim 18, wherein the shaft is a cable or chain.

21. The system of claim 18, wherein the sensor is a pressure sensor, a capacitive sensor or an optical sensor.

22. The system of claim 1, further comprising an computerized control system, wherein the computerized control system uses an algorithm to relate intent along one of the intent axes to a corresponding motion along one of the motion axes.

23. A system for controlling motion, the system comprising:
- a powered manipulator having a plurality of motion axes;
- a support member extending downward from the powered manipulator alone a substantially vertical axis; and
- a control handle mounted to the powered manipulator, wherein the control handle measures intent along a plurality of intent axes.

24. The system of claim 23, wherein the support member is a cable or a chain.

25. The system of claim 24, wherein the plurality of motion axes is three motion axes, and wherein the plurality of intent axes is three intent axes.

26. The system of claim 23, wherein the support member is a rigid descender.

27. The system of claim 26, wherein the plurality of motion axes is four motion axes, and wherein the plurality of intent axes is four intent axes.

28. The system of claim 23, wherein the powered manipulator includes a plurality of motors, and wherein each of the motors moves the powered manipulator along at least one of the motion axes.

29. The system of claim 23, wherein the control handles uses a sensor to detect an intent along one of the intent axes and to cause the powered manipulator to move along a corresponding one of the motion axes.

30. The system of claim 29, wherein the sensor is a force sensor, a force/torque sensor or an optical sensor.

31. The system of claim 23, wherein the control handle uses a joystick having three rotational axes to detect intent along the intent axes, and wherein the joystick uses a plurality of potentiometers to measure rotation about the three rotational axes.

32. The system of claim 23, further comprising a computerized control system, wherein the computerized control system uses an algorithm to relate a measured intent along one of the intent axes to a corresponding drive speed of the powered manipulator along one of the motion axes.

33. A system for controlling an assist device, the system comprising:
- a powered manipulator having a plurality of motion axes;
- a support member extending downward from the powered manipulator along a substantially vertical axis, wherein the support member is configured to support a payload, and wherein the powered manipulator can move the support member along each of the plurality of motion axes;
- a shaft mounted to the powered manipulator; and
- a control handle connected to the shaft, wherein the control handle detects intent along a plurality of intent axes, and wherein each of the plurality of intent axes corresponds to one of the plurality of motion axes.

34. The system of claim 33, wherein the plurality of motion axes is three motion axes, wherein the support member can move along two of the motion axes in a horizontal plane, wherein a third motion axis is in a vertical plane, and wherein the powered manipulator can rotate the support member about the third motion axis.

35. The system of claim 34, wherein the plurality of motion axes includes a fourth motion axis for moving the support member in a vertical direction along the third motion axis.

36. The system of claim 33, wherein each of the plurality of intent axes corresponds to a different one of the plurality of motion axes.

37. The system of claim 33, wherein the control handle is mounted proximal to a first joint, wherein the first joint allows translation of the support member along a first axis, wherein the control handle is mounted distal to a second joint, and wherein the second joint allows translation of the support member along a second axis.

38. The system of claim 33, wherein the control handle is mounted distal to a first joint, wherein the first joint allows translation of the support member along a first axis, wherein the control handle is mounted distal to a second joint, and wherein the second joint allows translation of the support member along a second axis.

39. The system of claim 33, wherein the control handle is an inline slide handle configured to detect forces in a vertical direction, and wherein the powered manipulator includes a vertical motion device for moving the support member in a vertical direction.

40. The system of claim 39, wherein the vertical motion device is an electric hoist, a pneumatic balancer or a pneumatic cylinder.

* * * * *